United States Patent [19]

Connor et al.

[11] 3,825,766

[45] July 23, 1974

[54] ELECTRICAL CONTROL APPARATUS

[75] Inventors: John S. Connor, Greenwood; Robert E. Pugh, Grain Valley, both of Mo.

[73] Assignee: Fike Metal Products Corporation, Blue Springs, Mo.

[22] Filed: July 11, 1973

[21] Appl. No.: 378,252

[52] U.S. Cl............................ 307/9, 169/7, 169/2 A
[51] Int. Cl............................................ B63j 2/06
[58] Field of Search ................... 169/7, 2 A; 307/9; 115/.5 R; 307/92, 116, 117; 340/289

[56] References Cited
UNITED STATES PATENTS

| | | | |
|---|---|---|---|
| 3,489,912 | 1/1970 | Hoffman, Jr.............................. | 307/9 |
| 3,605,901 | 9/1971 | Grabowski et al....................... | 169/7 |
| 3,675,034 | 7/1972 | Abplanalp................................ | 307/9 |
| 3,754,602 | 8/1973 | Magdars................................... | 169/2 A |

*Primary Examiner*—Herman Hohauser
*Attorney, Agent, or Firm*—Schmidt, Johnson, Hovey & Williams

[57] ABSTRACT

Improved electrical control apparatus is provided for the correlated control of systems having some desired relationship of interdependence between the functional conditions and operational states of various electrically responsive parts thereof, such as systems including a selectively operable device requiring electrical energization for operation thereof and associated electrically actuatable equipment for suppressing an occurrence of a potential hazard to which operation of the device may adversely contribute. The apparatus achieves correlated control of the device and equipment of such systems by providing for actuation of the suppression equipment whenever it is in functional condition and needed, ordinary selective operation of the device only when the equipment is in functional condition, presentation of a warning indication of conditions adversely affecting the ability of the equipment or its associated actuating controls to function, special override controlled operation of the device under exceptional circumstances when the equipment is known to be in a non-functional condition, and presentation of a warning indication when the special override control has been invoked. The preferred form of the apparatus also includes self-checking features for assuring its own functional integrity or indicating a fault therein. The apparatus is illustrated by an embodiment showing application of the invention to the corrlated control of a system involving internal combustion engines and fire suppression equipment such as employed in inboard powered boats, from which example the applicability of the apparatus to other systems involving comparable considerations should be apparent.

15 Claims, 1 Drawing Figure

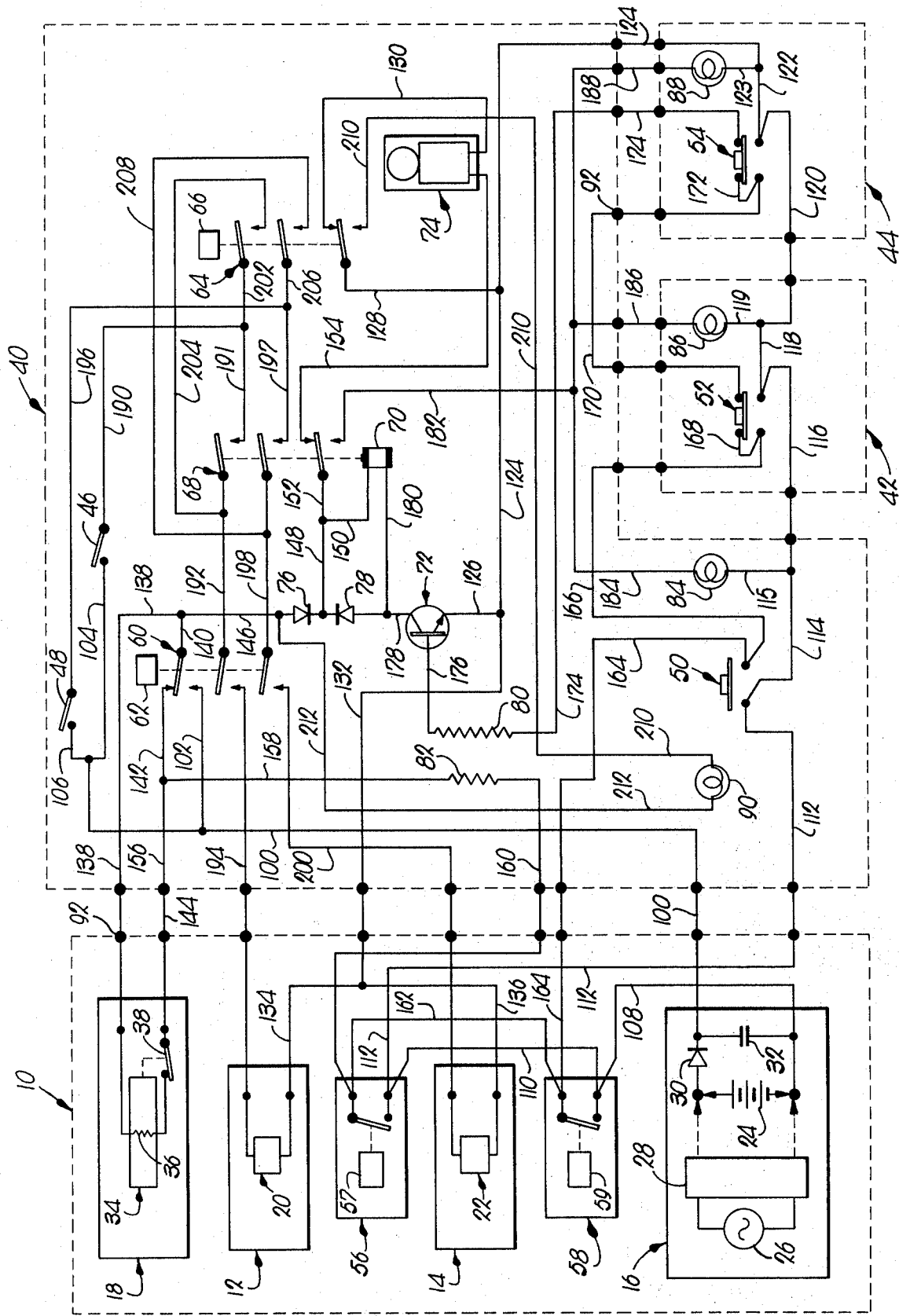

ELECTRICAL CONTROL APPARATUS

This invention broadly relates to improved electrical control apparatus especially adapted for use in connection with systems involving a number of electrically actuatable units of which one is actuated only under special circumstances and after each actuation thereof requires replacement, replenishment, resetting or the like before it can again be actuated for optimum performance of its intended function, while others, for reasons of safety or otherwise, should normally not be operated unless or until the first-mentioned one is in its fully functional condition. An important sub-class of such systems to which the invention is also applicable further require, however, that provision be made for a user to be able in an emergency or the like to operate the above-mentioned other units even when the above-mentioned one unit is known to be non-functional.

A typical and more specific example of the type of systems to which the control apparatus of the invention is primarily applicable is a system in which electrically actuatable equipment for suppressing an occurrence of some hazard, such as fire, is associated with one of more selectively operable devices, such as internal combustion engines having a supply of inflamable fuel, wherein said devices require electrical energization for operation but themselves contribute to the existence of seriousness of the hazard when operated. Location of such an exemplary system in a particular operational environment, such as on a boat, illustrates the mentioned subclass of systems in which it may be essential for the user to be able under emergency conditions to operate the boat powering engines (or other devices) in order to reach port (or accomplish some other vital objective) even when the fire suppression equipment (or other unit) is in non-functional condition.

Although from the disclosure of the invention being made it will be clear that the subject control apparatus is adaptable for application with systems of varying detail, and those skilled in the art will no doubt perceive many such applications in their own areas of individual system interest, for the sake of clarity and comparative brevity of explanation the invention is shown in the drawing and hereinafter described for illustrative purposes with reference to a preferred specific embodiment, which has already received remarkable commercial acceptance as the solution to a serious and long existing problem, in which the improved electrical control apparatus is applied to the correlated control of engines and fire suppression equipment provided in the operating system for an inborad powered boat.

The environment of application of the embodiment of the invention chosen for illustration well reveals the kind of problems and operational considerations that are typically involved in the type of systems for which the improved control apparatus is especially advantageous. Boats powered by inboard gasoline engines are notoriously vulnerable to the ever-present hazard of potential fires. Such engines are normally located in a relatively confined area below decks in which gasoline fumes and even liquid fuel can accumulate in the event of a fuel line leak or from other causes; and, since various causes, such as engine overheating or electrical sparking from components or wiring of the engine's ignition system, can serve to ignite combustible material in such area, the direct relationship between the potential hazard and operation of inboard boat engines is apparent. Unfortunately, once a gasoline fire aboard a boat has really gotten under way, it is virtually impossible to effectively extinguish the same with hand extinguishers or other means commonly available until recently on small and medium sized craft.

Because of the seriousness of this problem, both in terms of risk to personnel and the high probability of substantial property loss in the event of a boat fire that is not immediately squelched, it has now become common to provide fire suppression equipment on inboard boats of the kind employing a replaceable or rechargeable container filled with a suppressant medium under high pressure which, when released into the engine room or below deck area of the boat, so quickly and fully fills and permeates such area as to immediately squelch and smother any fire getting started therein. Such equipment is probably actuated by opening an electrically responsive gate or valve, which is usually of the explosive squib operated type to assure quick and full release of the medium. Since the operation of such equipment involves the release of essentially all of its suppressant medium into the area being protected upon each actuation thereof, however, the equipment is then rendered non-functional for any further actuation until it has been serviced to replenish the supply of suppressant medium. Such prior systems have conventionally employed essentially separate and independent controls for the engines and the fire suppression equipment, typically involving one set of circuits including ignition switching means for selectively energizing the ignition (including starting) systems of the engines from a battery and another set of circuits for controlling energization of the gate of valve component of the suppression equipment from the battery to release the suppressant medium upon closure of manual or sensor operated switching means.

The mentioned conventional approach to the control of such systems has many disadvantages having potentially dangerous consequences. For instance, if the suppressing equipment has previously been actuated by automatic fire sensing means and thereby exhausted of its supply of suppressant medium during the course of extinguishing a prior fire occurring while the user is absent from the boat, he may unknowingly start an engine in operation and thereby start a new fire while the suppressing equipment remains non-functional. The same thing may occur if the equipment has been manually actuated without the user's knowledge by vandals or even by other authorized personnel during a previous trip when there is a break-down of communications. It is even possible during adverse conditions such as a severe storm that the suppressing equipment may be actuated without the user becoming immediately aware of such fact, whereupon continued operation of the engines may restart the fire after the protective equipment has been rendered inoperable until it has been serviced. Unfortunately, due to human factors, even the provision of some means to indicate when the suppression equipment has been previously actuated can not alone always be relied upon to prevent starting or continuance of operation of engines, particularly by subordinate crew members, when such operation is likely to start a new fire that will not be suppressable by the then non-functional protective equipment. Such conventional separate controls for the engines and the suppression equipment are further characterized by the lack of any effective means of protecting the overall system against operation of the engines when the suppression equipment, although not previously actuated, is actually incapable of functioning due to breakage or loosening of a vital electrical connection in the equipment control circuits —or even due to faulty installation which could remain undetected until the presumably rare occurrence of the first fire. Although not exhaustive, the various exemplary situations noted are sufficient to explain why, in systems in which reliability approaching 100 percent is critically needed, the conventional separate controls approach has fallen too short of the mark and has resulted in needless accidents and losses.

Accordingly, it is the primary object of this invention to provide improved electrical control apparatus for the correlated and reliable control of functionally interdependent devices and equipment, which overcomes the aforesaid and other disadvantages and limitations of control apparatuses heretofore conventionally employed in generally comparable applications for want of any previously available apparatus or conceptualization for accomplishing the results sought and attained by this invention.

Other objects of the invention will be made clear or become apparent to those skilled in the art from the disclosure of the illustrative application of a preferred embodiment to follow. By way of brief summary, however, it is noted that the invention in its preferred form reliably achieves the desired correlated control of functionally interdependent, electrically actuatable, engines or other selectively operable devices and fire suppression or other priority function equipment, while retaining that modicum of operational flexibility that may be required under emergency conditions on a fully advised, command decision basis, by providing for controlled manual or/and automatic actuation of the fire suppression or other priority function equipment whenever it is in functional condition and needed, self-checking of the functional integrity of portions of the control apparatus required for actuating such equipment, ordinary selective operation of the engines or other similarly system-related devices only when the equipment and the mentioned portions of the control apparatus are in functional condition, presentation of an alarm signal when the equipment or the mentioned portions of the control apparatus are sensed to be non-functional, special override controlled operation of the engines or other devices when considered necessary even with full knowledge of a non-functional condition of the equipment, and presentation of a warning signal when the special override control is invoked. Certain significant further relationships and preferred constructional details contributing to the unexpectedly high reliability and operational convenience of the improved apparatus will be explained in the context of the portions of the apparatus to which they relate as the following disclosure progresses.

In the accompanying drawing, the single FIGURE is an electrically schematic and physically diagramatic representation of the various functional components and associated electrical control assemblies and circuitry of the boat engine and fire suppression system chosen for illustration of the invention to which a preferred form of our improved electrical control apparatus is applied for accomplishing the desired correlated control of the system. It should be understood that the preferred embodiment thus shown is intended to be exemplary and to provide a basis for description of the essential principles of the improved control apparatus as applied to a typical system of the type mentioned, but that, in more or less elaborate systems (or in systems of specifically different nature), more or fewer (or correspondingly altered) components might be employed in both the control apparatus and the remainder of the system proper with appropriate corresponding modifications of circuitry details that should be apparent to those skilled in art from the illustrated embodiment, without sacrificing any of the primary advantages of the improved control apparatus of the invention.

Referring now to the drawing, the dotted-line box indicated by the reference numeral 10 represents an area in which the potential hazard to be protected against may occur, which on a boat would typically be the below-deck chamber or engine room that is so vulnerable to fires. Located in the area 10 are various operating units peculiar to the particular basic system involved which on an inboard powered boat would commonly include one or more internal combustion engines 12, 14, a source of electrical power 16, fire suppression equipment 18, and a fuel supply or lines (not shown) coupled to the engines 12, 14.

The engines 12, 14 each include functionally integral component and circuitry assemblies for starting and ignition, which are represented only diagramatically in the drawing as at 20 and 22 respectively, it being understood that each of the starting and ignition assemblies 20 and 22 may conventionally include a starter control switch (not shown) electrically coupled in parallel with the ignition circuitry portion of the assembly 20 and 22, but perhaps physically located remotely from the engines 12, 14.

The electrical power source 16 on boats will usually employ an ordinary storage battery 24, but as indicated by dotted line couplings, may alternately employ an alternating current generator 26 provided with conventional rectifying and filtering means 28. The preferred form of source 16 utilizing a battery 24 also may include a series coupled diode 30 and a shunt coupled capacitor 32 for purposes hereinafter explained.

The fire suppression equipment 18 broadly includes means for storing the suppressant medium (not shown), a gate or valve (not shown) for releasing the medium into the area 10, and, most significantly to this invention, an electrically responsive actuator 34 for opening the mentioned gate or valve upon the flow of a predetermined level of electrical current through the actuator 34. Those not already familiar with this general type of suppression equipment may desire to refer for background information on the subject to U.S. Pat. No. 3,762,479, issued Oct. 2, 1973, to the assignee of this invention upon application Ser. No. 198,344, filed Nov. 12, 1971. For purposes of this invention, however, it should be sufficient to note that the actuating component 34 is desirably characterized, prior to actuation thereof, by having an internal electrical impedance path 36 therethrough which will provide electrical continuity for passage of a biasing potential without the flow of sufficient current for actuation of the component 34, and further characterized by such path 36 being interrupted upon actuation of the component 34 (which is schematically represented in the drawing by the virtual switch 38 in series with the path 36). These characteristics, together with adaptability for reliable actuation of the component 34 at a reasonable electrical current level, are found in various types of gate or valve actuators; of these we prefer the explosive detonator or squib type of actuator for use as the component 34 (for rupturing a frangible valve diaphragm of the equipment 18), in which case the virtual switch 38 is presented by the physical opening of the impedance path 36 by destruction thereof when the squib is exploded during actuation of the component 34; however, insofar as the principles of the present invention are concerned, the component 34 could be a solenoid type actuator having a suitable internal impedance 36 through its winding and provided with an associated real switch 38 that is opened and latched in its open condition (until manually reset during servicing of the equipment 18) upon actuation of the solenoid component 34.

The dotted-line box 40 in the drawing represents a main control station, such as the steering cockpit of a boat, it being understood that the various control components shown as being preferably located at the station 40 may there be suitably contained in a separate control box or housing (not shown) or may be otherwise mounted on or adjacent the "dashboard" panel (not shown) normally provided at the station 40 of an inboard boat. The dotted-line boxes 42 and 44 represent auxiliary control stations, such as the "flying bridge" of a boat and a fire control station adjacent the engine room area 10 or elsewhere on the boat, it being understood that the control components shown as preferrably located at such auxiliary stations may be suitably housed or mounted for their protection and convenience of operation.

The components thus far identified essentially comprise parts of what may be regarded as a typical basic system to which the control apparatus of the invention is applicable. The operating components of the preferred form of control apparatus chosen for illustrating the invention will next be identified and described. To avoid impairment of clarity through undue cluttering of the drawing with unnecessary reference numerals, each component is identified by a reference numeral, but certain individual banks or contacts of switches and relays and certain connection points of various components will be adequately identified and referred to in terms of "upper," "lower," "right," "left," etc., all of which should be understood as referring to the accompanying drawing rather than physical orientations of the components themselves. The electrical couplings and relationships between the various components of the control apparatus and the basic system to which it is applied are shown by the connections indicated in the drawing and will be later herein described in connection with explanation of the operational states of the system and apparatus and the particular electrical circuit paths significant thereto.

Two classes of components of the control apparatus are also of type commonly included in the basic system being controlled, but, in the improved control apparatus of this invention, are coupled with the other components in a different and non-conventional manner. These include, first, an ignition switch 46, 48 for each of the engine devices 20 and 22 respectively, which are normally open, key-operated switches usually mounted on the control panel (not shown) of the station 40; and, secondly, one or more switches 50, 52, 54, 56, 58 for operating the actuating component 34 of the fire suppression equipment 18. Such switch or switches 50 etc. may be either of the manually operated type or may be of type operated automatically by a sensor 57, 59 in response to the sensing of any radiation, heat or other condition indicating the commencement of fire (or other hazard against which the equipment 18 is to provide protection). In the preferred embodiment illustrated, both manual type switches 50, 52, 54 and automatic sensor-operated switches 56, 58 are included, with the primary manual switch 50 at the main control station 40, one or more additional manual switches 52, 54 remotely located at auxiliary control stations 42, 44, and one or more normally automatic sensor type switches 56, 58 located in the hazard area 10 itself (which could also be of the manual type, if desired). It will also be noted that, although the primary switch 50 for actuating the equipment 18 requires only a single pair of normally open contacts, and although the control apparatus would be operable with some sacrifice in its self checking characteristics (as hereinafter explained) if the remote switches 52, 54 were likewise provided with only a single pair of normally open contacts connected in parallel with those of the switch 50, it is desirable that at least the remote switches 52, 54 be provided with a second normally closed pair of contacts, as illustrated, for use in checking the integrity of the wiring extending to the remote stations 42, 44 (and those skilled in the art will perceive that the hazard area switches 56, 58 could also be provided with a second pair of contacts connected in the same fashion as shown for the switches 52, 54, if desired, although this is usually unnecessary where the switches 52, 54 are of the permanently installed sensor type).

The remainder of the components of the improved control apparatus to be described, although of individually conventionally nature contributing to the general reliability and economy of the apparatus, are employed in a unique combination and in novel circuitry relationships to attain the somewhat unusual specific results desired in the intended application of the apparatus.

A manually controllable main system-activating switch 60, which may but need not require a key or the like 62 for operation thereof, is provided with ganged switch banks including a single pole double throw (upper) bank and a normally open single pole single throw (intermediate and lower) bank for each engine or device 12, 14 respectively. The switch 60 is shown in the drawing in its "off" condition, and the opposite operated condition thereof may be referred to as its "on" or "armed" condition.

A manually controllable override switch 64, which also may but need not require a key or the like 66 for operation thereof, is provided with ganged switch banks including a single pole double throw (lower) bank and a normally open single pole single throw (upper and intermediate) bank for each engine or device 12, 14 respectively. The switch 64 is shown in the drawing in its "normal" or "alarm" condition, and the opposite operated condition thereof may be referred to as its "override" condition.

A relay type, current flow responsive, switch assembly 68 is provided with an operating coil element 70 and ganged switch banks including a single pole double throw (lower) bank and a normally open single pole single throw (upper and intermediate) bank for each engine or device 12, 14 respectively. The relay 68 is shown in the drawing in its "deenergized" or "special situation" condition, and the opposite operated condition thereof may be referred to as its "energized" or "normal" condition.

A preferably solid-state, bias responsive, switching device 72 is shown for illustration as a common emitter coupled, NPN, transistor in which a control bias applied to the base terminal will control the conduction or non-conduction of electrical current between the emitter and collector terminals, although those skilled in the art will appreciate that any of various other ell-Known solid-state or electronic components (such as a SCR, a vacuum tube, etc.) could be equivalently employed with a bias potential applied to a control terminal thereof to control conduction and accomplish switching of the electrical path between two switched terminals thereof. It will be understood that, in the illustrated embodiment, when a positive bias potential of predetermined level is applied to the base or control terminal of the switching device 72, a conductive path for the flow of electrical current is established between the switched emitter and collector terminals thereof; but that, when such bias upon the control terminal of the device 72 is lacking, the path between the switched, emitter and collector terminals of the device 72 is non-conductive and acts as an open switch.

An alarm 74, illustrated as an electrically actuated bell or buzzer, may actually be any suitable form of component for generating a preferable audible warning signal.

A pair of diodes 76 and 78 are preferable provided to protect the solid-state device against possible damage or burn-out in the event that, during initial installation or replacement of the battery 24, the polarity of the power terminals of the source 16 should be erroneously connected with their polarities reversed.

A bias resistor 80, of typically 1,000 Ohms, is series coupled with the base or control terminal of the switching device 72. A smaller resistor 82, of typically 3 Ohms and 5 Watts power rating, is coupled in series with the switchable side of the circuitry hereinafter described for actuating the component 34 of the fire suppression equipment 18 and serves to limit the current flow through the actuating component 34 during actuating energization thereof to perhaps 3 Amperes, which is quite adequate for actuation; without the resistor 82, however, since a typical detonator type actuator component 34 may have an internal impedance 36 of only about 1 Ohm, the current surge upon actuation could otherwise be excessive.

The remaining discreet components of the apparatus, aside from the circuitry connections thereof include a preferably green indicating lamp 84, 86, 88 adjacent each of the equipment-actuating switches 50, 52, 54, and a preferably red indicating lamp 90 also at the main control station 40 adjacent the switch 50.

It is believed that the novel and advantageous electrical intercouplings and functional relationships between the above-noted components of the control apparatus and the system with which it is associated can now be most clearly and conveniently explained by reference to the various operational states which may occur and the circuits that are of particular significance in conjunction with each. Before commencing to trace and describe such circuits, however, it should be observed that the terminal-like symbols employed in the drawing as at 92 are intended merely to highlight the transition between exit and entry points of the different areas 10, 40, 42, 44, rather than to imply the presence of any physical connectors at such points; of course, conventional electrical connecting means could be employed wherever convenient, but the preferred construction of the apparatus contemplates that "hard-wire" cabling between components in different areas should normally be used in a permanent installation. It should be further observed, however, that, although many of the functions and advantages of the improved control apparatus of the invention may be realized through the use of any suitable form of electrical connections presenting electrically equivalent circuitry, nevertheless, the preferred form of permanent installation of the improved control apparatus achieves certain additional advantages with regard to self-checking of the integrity of the circuitry when the inter-component connections are made in substantially the fashion and order indicated in the drawing and hereinafter further described.

The first operational state of the illustrative system to which the improved control apparatus is applied in the drawing is with the system and apparatus deactivated, as it might be immediately after completion of installation or during intervals of non-use when the protection of having the fire suppression equipment 18 operable is not desired. In this condition, which is the one specifically shown in the drawing, the main system activating switch 60 is in its off or deactivated condition, the operating coil element 70 of the relay switch 68 is deenergized leaving the switch 68 in its special situation condition, the override switch 64 is in its normal or alarm condition, the ignition switches 46, 48 are in their open conditions, and the various switches 50, 52, 54, 56, 58 for actuating the component 34 of the fire suppression equipment 18 are each in their standby conditions. It may further be assumed that the actuating component 34 has not been previously actuated and that the lower impedance path 36 is intact, as represented by the virtual switch 38 being in its closed condition. It will be helpful in visualizing the circuit condition changes that occur during the operational status subsequently to be described, if the extent of continuity of the power leads emanating from the source 16 is traced for the initial, deactivated condition of the system and the apparatus. Thus, commencing from the upper or positive terminal of the electrical power source 16, it will be seen that such positive potential is coupled through leads 100 and 102 with the lower, normally open contact of the upper double-throw bank of switch 60, and by leads 100 and 104 or 106 with one contact of the ignition switches 46, 48 respectively, all of which connections are effectively "dead-ended" by the conditions of switches 46, 48 and 60 when such switches are in the conditions indicated. Similarly, the lower or negative terminal of the power source 16 is coupled by electrical connecting lead 108 with the lower terminal of the sensor switch 58, which is in turn coupled by lead 110 with the lower terminal of sensor switch 56, which is in turn coupled by lead 112 with one contact of the manual switch 50, which is in turn coupled by leads 114 and 115 with one side of the green indicating lamp 84 and by leads 114 and 116 with the lower right contact of manual switch 52, which is in turn coupled by leads 118 and 119 with one side of the green indicating lamp 86 and by leads 118 and 120 with the lower right contact of manual switch 54, which is in turn coupled by leads 122 and 123 with one side of the green indicating lamp 88 and by leads 122, 124 and 126 with the switched, emitter terminal of the electronic switch 72. The lead 124 is further coupled by the lead 128 through the then closed pole and upper contact of the lower bank of override switch 64 and by lead 130 with one terminal of the alarm component 74. The lead 124 is also further coupled by lead 132 and lead 134 or 136 with the lower terminal of the ignition-starting assemblies 20, 22 of the engine devices 12, 14 respectively. It will be observed, however, that because of the above mentioned dead-ending of the leads emanating from the positive terminal of the source 16 no completed energizing circuit is presented, nor can be presented for the assemblies 20, 22 of the engine devices 12, 14 or the component 34 of the fire suppression equipment 18 or the operating element 70 of switch 68 or any of the other electrically operable components 72, 74, 84, 86, 88 or 90.

There is one additional circuit which is highly significant, however, which is completed when the system and apparatus are in their deactivated condition as illustrated in the drawing. Such circuit is, indeed, provided for the express purpose of shunting across the activating component 34 of the fire suppression equipment 18 when the system and apparatus are in their deactivated condition, in order to prevent any inadvertent detonation or actuation of the component 34 as a result of electrical transients picked up in the wiring from electrical interference sources such as may be especially likely to exist when a boat is tied up at the dock with its system and apparatus deactivated. Such circuit for thus protecting the component 34 against undesired operation by such possible transients is traced from the upper terminal of the component 34, through leads 138 and 140 to the pole of the upper bank of switch 60, thence to the upper, closed contact of such upper bank of switch 60, and thence through leads 142 and 144 to the lower terminal of the component 34.

Although probably apparent to those skilled in the art, it should perhaps be observed that the electrical polarities illustrated and being described were selected because of the particular type of bias responsive, solid state switch 72 chosen for use in the preferred embodiment, and over-all reversal of such polarities and the corresponding connections could equally well and might necessarily have to be employed if an equivalent but specifically different type of component was selected for employment as the switch 72.

The next condition of the system and control apparatus to be considered is that which prevails during the steps of initiating normal operation of the system and apparatus to permit functioning of at least the fire suppression equipment 18. To bring about this condition, the user will shift the main system activating switch 60 from the off condition illustrated in the drawing to the opposite on or armed condition thereof in which the pole of the upper bank of switch 60 is closed with the corresponding lower contact of such upper bank and the poles of the intermediate and lower banks of switch 60 are closed with their respective lower contacts. This operation of switch 60, first, effects breaking of the previously traced shunting circuit 138, 140, 142, 144 for the component 34. Closing of the pole of the upper bank of switch 60 with the corresponding lower contact extends the continuity of the previously traced positively energized circuit from lead 102 through lead 140 and lead 138 to the upper terminal of the component 34 of the equipment 18, and also extends the positively energized portion of the circuitry from lead 140 through lead 146, diode 76 and leads 148 and 150 to the upper terminal of the operating coil element 70 of the relay switch 68. The lead 148 is also coupled by a lead 152 with the pole of the lower bank of relay switch 68, which, by virtue of the further lead 154 from the upper contact of the lower bank of switch 68 to the left terminal of the alarm 74 may result in momentary activation of the latter (which is desirable for testing purposes) until the relay 68 has been shifted into its energized or normal condition as hereinafter described. The positive potential applied to the upper terminal of the actuating component 34 is transmitted through the lower internal impedance path 36 and the effectively closed virtual switch 38 of the component 34 along a path traceable from the lower terminal of the component 34, leads 156 and 158, the current limiting resistor 82 and lead 160 to the upper terminal of the sensor switch 56, thence through lead 162 to the upper terminal of sensor switch 58, thence through lead 164 to the right terminal of switch 50, thence through lead 166 to the lower left terminal of switch 52, thence through a bridging lead 168, the normally closed upper contact of switch 52 and a lead 170 to the lower left contact of switch 54, thence through a bridging lead 172, the normally closed upper contacts of switch 54, a lead 174, the bias resistor 18 and a lead 176 to the base or control terminal of the solid state switch 72. By this last mentioned circuit a positive biasing potential is passed through the internal impedance 36 of the actuating component 34 and bias resistor 80 to the control terminal of the switch 72; however, since the device 72 is of nature such as to draw no substantial electrical current through its base or control terminal, there is an insufficient flow of current through the component 34 to actuate the latter in this condition of the apparatus. The application of a positive bias to the control terminal of the solid state switch 72 causes the switch to become electrically conductive between the switched emitter and collector terminals thereof, which completes a circuit for the flow of current to the lower terminal of the operating element 70 of switch 68 from the collector of switch 72 through leads 178 and 180. A complete circuit along the positive and negative paths previously traced is thereby established for energizing the operating element 70 of the switch 68 as long as the solid state switch 72 remains in its conductive state. Energization of element 70 shifts the current flow responsive relay switch 68 to its normal or energized condition, hich is the opposite from that shown in the drawing, which thereby shifts the pole of the lower bank of switch 68 away from the corresponding upper contact (to terminate any previous momentary operation of the alarm 74) and into closed relationship with the corresponding lower contact of the lower bank of switch 68, which energizes the green indicating lamps 84, 86, 88 through lead 182 and leads 184, 186 and 188 respectively.

At this point, the consequences of various fault conditions may be noted to illustrate the self-checking functioning of the improved control apparatus of the invention. First, shifting of the main control switch 60 will normally always result in energization of the green indicating lamps 84 86 and 88 at each of the alternate control stations 40, 42, 44, unless some fault exists in the system or its associated circuitry, this energization of lamps 84, 86 and 88 being ultimately controlled by the energization of element 70 and the shifting of relay switch 68 to its normal, energized condition. Secondly, and also dependent upon such operation of the relay switch 68, is the cutting-off of operation of the alarm 74, which would otherwise continue when the switch 60 is shifted to its on or armed condition unless the relay switch 68 also promptly is operated into its normal, energized condition. Such operation of the switch 68 being in turn dependent upon the solid state switch 72 being switched into its conductive condition, it will be clear that the faults which may cause the solid state switch 72 to remain non-conductive include a break in any of the circuit paths above traced to the switch 72.

The significance of the preferred manner and order of connections to components shown in the drawing and previously described should now become more apparent, in that, by wiring the negative lead to the emitter terminal of switch 72 via corresponding contacts on the successive equipment-actuating switches 58, 56, 50, 52 and 54, and by wiring the bias carrying circuit from the lower terminal of the component 34 to the base or control terminal of the switch 72 via the corresponding other contact of successive switches 56, 58, 50, 52 and 54 (as well as through a second pair of normally closed contacts provided in the preferred embodiment of switches 52 and 54), the integrity of these vital circuits is virtually assured. Moreover, since such circuits to the switches 50, 52, 54, 56 and 58 are the ones employed for actuating the component 34, as hereinafter described, such self-checking feature of the circuitry of our improved control apparatus is advantageous in revealing either a failure to make the proper electrical interconnections during initial installation (which might not otherwise be recognized until the first abortive effort to actuate the component 34 during a fire) or by a connection having loosened due to vibration or the like. With the preferred embodiment of the improved control apparatus, however, any such fault in the biasing and operating circuits of the solid state switch 72 will normally keep such switch 72 from becoming conductive, and will thereby maintain the switch 68 in its special situation condition for actuating the alarm 74 and failing to energize the green lamps 84, 86, 88, either of which conditions will alert the user to the existence of an abnormal condition.

Before considering the circuit paths for actuating the component 34, the condition of the system and control apparatus during normal operation of the engine device 12, 14 should be considered, since any actuation of the component 34 will interrupt the internal path 36, 38 there through, and thereby move the positive bias from the control terminal of the solid state switch 72, with consequent deenergization of the operating element 70 of relay switch 68 and shifting of the latter into its special situation condition deenergizing the lamps 84, 86 and 88 and energizing the alarm 74.

With the main switch 60 in its on or armed condition and the relay switch 68 in its normal or energized condition, the ignition switches 46 and 48 may be closed to thereby extend the continuity of the positive side of the energizing circuits for the ignition-starting assemblies 20 and 22 of engines 12 and 14 along respective paths leading from the ignition switch 46 through leads 190 and 191, the closed switch of the upper bank of switch 68, a lead 192, the closed switch of the intermediate bank of switch 60 and a lead 194 to the upper terminal of the assembly 20, and, in the case of the engine 14, from the ignition switch 48 through leads 196 and 197, to the closed switch of the intermediate bank of relay switch 68, a lead 198, the closed switch of the lower bank of main switch 60 and a lead 200 to the upper terminal of ignition-starting assembly 22. Note that the energizing or operating circuits for the assemblies 20 and 22 will then be immediately interrupted by any shifting of the relay switch 68 to its special situation condition; in the preferred embodiment of apparatus illustrated, such circuit for the operation of the engines 12, 14 would also be broken by any fault or break that might occur in the negative lead previously traced and which assures negative side connections to the appropriate terminals of the equipment actuating switches 50, 52, 54, 56 and 58, as well as the leads providing negative side connections for the alarm 74 and the solid state device 72 (in a less optimised self-checking system, however, it will be apparent to those skilled in the art that the negative side connections to the ignition-starting assemblies 20, 22 could be wired directly to the negative terminal of the power source 16, if desired, and the functioning of the switches 72 and 68 relied upon for indicating any fault).

It will next be appropriate to consider the manner in which the component 34 may be either manually or automatically actuated. Recalling that positive side energization is during normal operation being continuously applied to the upper terminal of the actuating component 34 by the circuitry previously traced from the pole of the upper bank of switch 60 through conductors 140 and 138, it will be apparent that actuation of the component 34 will occur upon any connection of the lower or negative terminal of the power source 16 to the lower terminal of the component 34. For one example of such activation, assume that the temperature within area 10 reaches a critical point for closing the automatic switch 58 through the action of its associated sensor 59; in this case, the negative side connection to the lower terminal of the actuating component 34 is completed by a circuit traceable from the lower negative terminal of the power source 16 through lead 108, the closed switch 58, lead 162, lead 160, current limiting resistor 82, lead 158 and lead 156 to the lower terminal of the component 34. The completion of such circuit results in immediate actuation of the component 34 to activate the fire suppression equipment 18. Another example of the manner in which the negative side connection to the component 34 may be completed would be by the user operating the manual switch 52, whereupon negative side continuity may be traced from the lower negative terminal from the source through leads 108, 110, 112, 114, and 116, the closed lower pair of contacts of switch 52, leads 166, 164, 162 and 160, limiting resistor 82, and leads 158 and 156 to the lower terminal of the component 34.

It will be noted that the diode 30 and capacitor 32, which may be associated with power source 16 (particularly when more than equipment 18 is employed with their components 34 in parallel), serve to assure, by continuously retaining a charge upon the capacitor 32, that sufficient electrical energy will always be instantaneously available from the source 16 for actuating the component 34 without delay, despite any tendency toward diminishment that might occur from internal impedances of the battery 24 when coupled directly across the very low impedance path 36 presented by the actuating component 34.

The next significant condition of the system and control apparatus, therefore, is the condition existing after the component 34 has been actuated to operate the fire suppression equipment 18 either manually or as a result of automatic sensing of an occurrence of a hazard condition in the area 10. As noted above, actuation of the component 34 effectively opens the internal virtual switch 38 of the component 34, which comes about by actual destruction of the internal impedance path 36 in a component 34 of the preferred detonator type. As soon as the path 36 is interrupted, positive biasing potential will no longer be passed to the base or control terminal of the bias responsive switch 72, the latter will be rendered non-conductive as between the switched, emitter and collector terminals thereof, the energizing circuit for the operating element 70 of the relay switch will thereby be broken and the relay switch 68 will shift into its special situation condition. This, in turn, interrupts the positive side of the above traced energizing paths for the assemblies 20, 22 of engines 12, 14, turns off the green indicating lamps 84, 86, 88 and actuates the audible alarm 74. Of these consequences of activation of the component 34, the first is perhaps the most vital, in that, it requires no user recognition or action, but rather automatically shuts down operations of the engines 12, 14 which might otherwise result in ignition of a new fire if their operation were to be continued even after successful activation of the fire suppression equipment 18 to extinguish a first fire. In this condition the engines 12, 14 are rendered and normally maintained in inoperative condition unless and until there has been further positive user intervention.

The final possible condition of the system and apparatus, however, recognizes that under exceptional circumstances, such as the occurrence of a fire while at sea, it might be vital to the over-all safety of the boat or personnel for the user, as a matter of command decision, to be able to operate the engines 12, 14 even though the extinguishing equipment had already been once operated. Most desirably, a boat should carry with it replacement cartridges of suppressant medium and replacement components 34 so that, after a fire has been extinguished, the system and apparatus may be restored to its normal functional condition before the engines 12, 14 are again operated. However, if no such replacements are available or if full extinguishment of the initial fire has not been accomplished, it may then be necessary for the boat commander to operate the engines 12, 14 to seek port or aid as quickly as possible. It is for this purpose that the override switch 64 and its associated circuitry is provided. Assuming that the main switch 60 remains in its on condition and that the ignition switches 46 and 48 are closed, it will be noted that the protective interruption of the positive side of the energizing circuits for the ignition-starting assemblies 20, 22 is localized at the upper and intermediate switch banks of the relay switch 68, and that the protective automatic shut-down of the engines 12, 14 effected by the shifting of the relay switch 68 to its special situation condition may be overridden by bypassing the upper and intermediate switch banks of the relay 68. This is accomplished, when the override switch 64 is manually shifted to its override condition by a circuit for the engine 12 traceable from the lead 190 through a lead 202, the closed switch of the upper bank of switch 64 and a lead 204 to the conductor 192, while the comparable bypass for the engine 14 is traced from the lead 196 through a lead 206, the closed switch of the intermediate bank of switch 64 and a lead 208 to the lead 198. With these bypasses effectuated by operating the switch 64 to its override condition, it will be apparent that the engines 12, 14 may be started and operated by means of the ignition-starting circuits hereinbefore otherwise traced. Operation of the override switch 64 to its override condition performs the further function of establishing continuity for the negative side of the circuit for energizing the red indicating lamp 90 (which indicates to the user that the override condition of the system and apparatus has been invoked and that the fire suppression equipment 18 is presumably non-functional), which circuit is traceable from the lead 128 through the pole and lower contact of the lower bank of switch 64 and a lead 210 to the red indicating lamp 90, the other side of lamp 90 deriving positive energization through the lead 212 connected with the lead 146.

It should, therefore, be appreciated that the improved control apparatus of this invention provides a unique combination of advantageous protective features for accomplishing the correlated control of functionally interdependent equipment and devices such as the fire suppression equipment 18 and the engines 12, 14 in manner providing both automatic but overrideable restraints against inadvertent initiation or continuance of dangerous operating conditions and user sensable indications of the particular condition existing in the over-all system, including protection and indication of faults revealed to the apparatus by its self-checking capabilities. Those skilled in the art will further appreciate, however, that various minor modifications could be made from the exact details of construction of the preferred embodiment shown and described for illustrative purposes without departing from the gist and essence of the invention. Accordingly, it should be understood that it is intended that the invention be deemed limited only by the fair scope of the claims that follow and mechanical equivalents thereof.

We claim:

1. Electrical apparatus for the correlated control of a device-operating and hazard-suppressing system of the type including (a) a selectively operable device of character such that operation of the device contributes to the existence or seriousness of a potential fire or other hazard in an area with which the device is associated, said device having a pair of terminal means across which electrical power must be applied for operation of the device, (b) selectively actuatable equipment for suppressing an occurrence of said hazard in said area, said equipment including an electrically responsive component having a pair of terminal means across which electrical power may be applied for actuating said suppressing equipment, said component normally providing an electrically conductive path between said terminal means thereof, said path being rendered non-conductive by an actuation of said equipment, and (c) means presenting a source of electrical power having a pair of terminal means; said control apparatus comprising:

a system activating switching means provided with at least one pair of switched terminal points and having a selectable off condition in which said one pair of terminal points thereof are effectively electrically isolated from each other and a selectable on condition in which said one pair of terminal points thereof are effectively electrically coupled with each other;

at least one equipment-actuating switching means each provided with at least one pair of switched terminal points and having a standby condition in which said one pair of terminal points thereof are effectively electrically isolated from each other and an operated condition in which said one pair of terminal points thereof are effectively electrically coupled with each other;

a current flow responsive switching means provided with an operating element having a pair of energizing terminals and at least one pair of switched terminal points, said current responsive switching means having a special situation condition in which said element is deenergized and said one pair of terminal points thereof are effectively electrically isolated from each other and a normal operating condition in which said element is energized and said one pair of terminal points thereof are effectively electrically coupled with each other;

a bias responsive switching means provided with a pair of switched terminal points and a control terminal biasable relative to said terminal points thereof by an electrical potential applied to said control terminal and having a fault or absence-of-bias responsive, non-conducting condition in which said pair of terminal points thereof are effectively electrically isolated from each other and a normal, biased, operating, conductive condition in which said pair of terminal points thereof are effectively electrically coupled with each other;

first circuit means for applying electrical power across said terminal means of said device to permit operation of the latter when said system-activating switching means is in its on condition and said current responsive switching means is in its normal operating condition, said first circuit means including means for electrically coupling said terminal means of said device, said one pair of terminal points of said current responsive switching means and said one pair of terminal points of said system-activating switching means in a series circuit between said terminal means of said power source means;

second circuit means for applying electrical power across said terminal means of said component of said suppressing equipment to actuate the latter when one of said equipment-actuating switching means is in its operated condition, said second circuit means including means for electrically coupling said one pair of terminal points of said operated one of said equipment-actuating switching means and said terminal means of said component of said equipment in a series circuit between said terminal means of said power source means;

third circuit means for energizing said operating element of said current responsing switching means to place the latter in its normal operating condition when said bias responsive switching means is in its normal operating condition, said second circuit means including means for electrically coupling said terminal points of said bias responsive switching means and said energizing terminals of said current responsive switching means in a series circuit between said terminal means of said power source means; and fourth circuit means for applying a bias potential to said control terminal of said bias responsive switching means to place the latter in its normal operating condition when said one equipment-actuating switching means is in its standby condition and said suppressing equipment has not been previously actuated to render said path through said component thereof non-conductive, said fourth circuit means including means for electrically coupling said control terminal of said bias responsive switching means with a part of said second circuit means that is coupled with one of said pair of terminal means of said power source means only when one of said equipment-actuating switching means is in its operated condition and which is separated from the other of said pair of terminal means of said power source means by the series interposition of said terminal means of said component of said suppressing equipment therebetween.

2. The invention of claim 1, wherein:

said system-activating switching means further includes at least a third switched terminal point, one of said one pair of terminal points of said system-activating switching means being effectively electrically coupled with the other of said one pair of terminal points thereof when said system-activating switching means is in its off condition, and with said third terminal point thereof when said system-activating switching means is in its on condition, said one terminal point of said pair thereof and said third terminal point being electrically coupled in series with said second circuit means, said one terminal point of said one pair thereof being electrically coupled with a part of said second circuit means that is coupled with one of said terminal means of said component of said suppressing equipment, said other terminal point of said one pair thereof being electrically coupled with a part of said second circuit means that is coupled with the other of said terminal means of said component of said suppressing equipment, whereby to provide a shunting circuit across said terminal means of said component when said system-activating switching means is in its off condition.

3. The invention of claim 1, wherein said control apparatus further includes:

a device-operating switching means provided with a pair of switched terminal points and having a selectable off condition in which said terminal points thereof are effectively electrically isolated from each other and a selectable on condition in which said pair of terminal points thereof are effectively electrically coupled with each other, said terminal points of said device-operating switching means being effectively electrically coupled in series with said first circuit means, whereby to provide for selective control over the operation of said device when said equipment is functional, while permitting actuation of the equipment even when the device is not being operated.

4. The invention of claim 1, wherein:

said equipment-actuating switching means includes a plurality of normally open switches each having at least first and second switched terminal points, said third circuit means being successively connected with said first terminal points of each of said switches between one of said terminal means of said power source means and one of said energizing terminals of said current responsive switching means, said fourth circuit means being successively connected with said second terminal points of each of said switches between said control terminal of said bias responsive switching means and one of said terminal means of said actuating component of said suppressing equipment.

5. The invention of claim 4, wherein:

at least one of said switches is provided with third and fourth terminal points and a pole normally bridging said third and fourth terminal points but adapted to bridge said first and second terminal points when the switch is operated, said third and fourth terminal points being electrically coupled in series with said fourth circuit means.

6. The invention of claim 1, wherein:

said equipment-actuating switching means includes a plurality of normally open switches each having at least one pair of switched terminal points, said one pair of terminal points of each switch being effectively coupled in parallel with each other and collectively in series with said second circuit means, at least one of said switches being provided with a hazard condition sensor for automatically operating the same, at least another of said switches being provided with means for selective manual operation thereof.

7. The invention of claim 1, wherein said current responsive switching means is provided with at least a second pair of switched terminal points which are effectively electrically coupled with each other only when said current responsive switching means is in one of said conditions thereof; and said control apparatus further includes:

first electrically operable signalling means having a pair of energizable terminal points; and fifth circuit means for operating said first signalling means to indicate when said current responsive switching means is in said one condition thereof, said fifth circuit means including means electrically coupling said second pair of terminal points of said current responsive switching means and said energizable terminal points of said first signalling means in a series circuit between said terminal means of said power source means, whereby to provide operating personnel with an indication of functional state of the system.

8. The invention of claim 7, wherein said control apparatus further includes:

an override switching means provided with at least two pairs of switched terminal points and having a selectable normal condition in which a first of said pairs of terminal points thereof are effectively electrically isolated from each other and a second of said pairs of terminal points thereof are effectively electrically coupled with each other and a selectable override condition in which said first pair of terminal points thereof are effectively electrically coupled with each other and said second pair of terminal points thereof are effectively electrically isolated from each other, said second pair of terminal points of said override switching means being interposed in series with said fifth circuit means; and sixth circuit means for bypassing said one pair of terminal points of said current responsive switching means, said sixth circuit means including means electrically coupling said first pair of terminal points of said current responsive switching means in shunt with said one pair of terminal points of said current responsive switching means, whereby to permit operation of said device under compelling circumstances even when it is known that said suppressing equipment has been rendered non-functional by a previous actuation thereof or other causes.

9. The invention of claim 8, wherein:

said system-activating switching means further includes at least a third switched terminal point, one of said one pair of terminal points of said system-activating switching means being effectively electrically coupled with the other of said one pair of terminal points thereof when said system-activating switching means is in its off condition, and with said third terminal point thereof when said system-activating switching means is in its on condition, said one terminal point of said pair thereof and said third terminal point being electrically coupled in series with said second circuit means, said one terminal point of said one pair thereof being electrically coupled with a part of said second circuit means that is coupled with one of said terminal means of said component of said suppressing equipment, said other terminal point of said one pair thereof being electrically coupled with a part of said second circuit means that is coupled with the other of said terminal means of said component of said suppressing equipment, whereby to provide a shunting circuit across said terminal means of said component when said system-activating switching means is in its off condition.

10. The invention of claim 9, wherein said control apparatus further includes:

a device-operating switching means provided with a pair of switched terminal points and having a selectable off condition in which said terminal points thereof are effectively electrically isolated from each other and a selectable on condition in which said pair of terminal points thereof are effectively electrically coupled with each other, said terminal points of said device-operating switching means being effectively electrically coupled in series with said first circuit means, whereby to provide for selective control over the operation of said device when said equipment is functional, while permitting actuation of the equipment even when the device is not being operated.

11. In a marine operating and fire protection system for a boat:

an engine having an electrically energizable ignition assembly provided with a pair of terminals;

fire suppression equipment having an electrically actuatable component provided with a pair of terminals between which an internal conductive path is presented only until said component has been once actuated;

a source of electrical power provided with a pair of terminals;

electrical equipment-actuating, circuit means for coupling said terminals of said equipment with said terminals of said power source;

at least one normally open, equipment-actuating switch interposed in series with said equipment-actuating circuit means;

electrical, engine-operating, circuit means for coupling said terminals of said ignition assembly with said terminals of said power source;

an ignition switch interposed in series with said engine-operating circuit means;

control switch means interposed in series with said engine-operating circuit means; and electrically responsive means for operating said control switch means, including electrical control circuit means coupled with said component of said equipment, for sensing the presence or absence of said internal conductive path and for closing said control switch means when said path is present and opening said control switch means when said path is absent.

12. The invention of claim 11, wherein is provided:

electrically operable indicating means coupled with said control switch means for signalling the operational state of the latter.

13. The invention of claim 12, wherein is provided:

a normally open manual override switch electrically coupled in parallel with said control switch means.

14. The invention of claim 13, wherein:

said operating means for said control switch means includes a bias responsive switching device having a control terminal coupled with said component of said equipment.

15. The invention of claim 14, wherein is provided:

manually reversible, system-activating, switching means having normally open switched paths and a normally closed switched path;

circuit means coupling said normally open paths in series with said equipment-actuating circuit means and said engine-operating circuit means; and circuit means coupling said normally closed path in shunt across said terminals of said actuating component of said fire suppression equipment.

* * * * *